UNITED STATES PATENT OFFICE.

ANTON MESSERSCHMITT, OF STOLBERG, GERMANY.

PROCESS OF OBTAINING ALKALI-METAL COMPOUNDS FROM SILICATES CONTAINING THE SAME.

1,087,132. Specification of Letters Patent. Patented Feb. 17, 1914.

No Drawing. Application filed April 6, 1912. Serial No. 689,049.

*To all whom it may concern:*

Be it known that I, ANTON MESSERSCHMITT, a subject of the German Emperor, residing in the city of Stolberg, Rhine Province, Germany, have invented new and useful Improvements in Processes of Obtaining Alkali-Metal Compounds from Silicates Containing the Same, of which the following is a specification.

This invention relates to a method for extracting pure alkali compounds from silicates containing alkali-metals compounds.

In silicate minerals containing alkali compounds, as feldspar, phonolite, mica, trass, etc., potassium never occurs pure, but always in connection with sodium. While in feldspars for instance the amount of potassium contained therein exceeds that of sodium, this proportion is inverted in other minerals. When, therefore, such silicates are rendered soluble by treatment with suitable calcium or magnesium compounds, as for instance caustic lime, limestone, slime of calcium compounds, magnesia or the like, mixtures of potassium and sodium compounds are always produced. But these mixtures cannot be used in this form. A practical method for separating them is not known so far. But such a method would be very important as pure potassium compounds are far more valuable than the corresponding sodium compounds. On the other hand a high degree of purity is required. The difficulties in extracting pure alkali-metals compounds from minerals are still greater because the alkali-metals compounds obtained are present in the resulting lye not only in the form of hydroxids, but often in considerable quantities as carbonates, aluminates, silicates, and in some cases also as manganates.

The object of the present invention is a method for separating the mixture of alkali-metals compounds into pure potassium and sodium compounds, said mixtures being obtained by decomposing minerals containing silicates with lime-stone or other calcium compounds.

The essential feature of the invention is to change the alkali-metals compounds obtained into alkali nitrates by treating them with nitrates whose bases precipitate in alkaline solution, as for instance calcium nitrate, or by treating said alkali-metals compounds with nitric acid or nitro-gases, all of which nitrating compounds I hereinafter refer to as nitrating compounds.

Experiments have been made to obtain potassium in form of potassium nitrate from certain silicates containing potassium and which are soluble in acids, as for instance leucite by treating such minerals directly with nitric acid. But this method has the disadvantage that in addition to potassium, other bases, especially aluminium compounds, iron oxid, magnesia, lime, etc., which occur in almost all natural minerals, are dissolved as nitrates. Large quantities of jelly-like silicic acid are separated in this process so that it is extremely difficult to separate the soluble nitrates from the insoluble residue, and to isolate the nitrate of potassium from the excess of the compounds mixed therewith. These difficulties are overcome according to the present invention in such a way that the alkali-metals compounds are transformed wholly or partly into nitrates. The method may be, for instance, applied in such a manner that the lye obtained by decomposing the silicate-minerals is supplied with calcium nitrate in such a proportion that the nitric acid present is exactly equivalent to the alkali-metals compounds in solution. The following reactions will then take place:

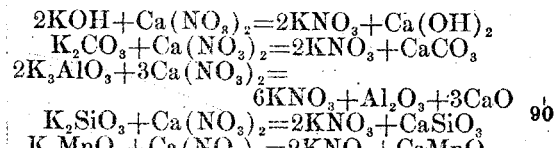

The sodium compounds are transformed, of course, in the same way as the potassium compounds mentioned in the formulas above.

As stated before, other nitrates whose bases precipitate in alkaline solution act in the same manner as calcium nitrate, as for instance iron nitrate, magnesium nitrate, etc. This fact is important because these compounds occur frequently as impurities of the commercial calcium nitrate and do not disturb the reaction. If ions of nitric acid are present in excess, only calcium nitrate is in solution; the same reaction takes place to a small extent if the solution is kept slightly alkaline. This impurity which can hardly be avoided by applying the method on a commercial scale, can, of course, be precipitated easily by adding a little alkali carbonate, this clears at the same time the solution quickly. On the other hand, by adding free nitric acid the alkaline solution can be neutralized. By treating the lyes with calcium nitrate as described above solutions of very pure potassium and sodium nitrates are therefore obtained besides insoluble calcium compounds. The nitrate solution obtained thus is concentrated correspondingly and the nitrates contained therein are crystallized fractionally. By cooling the solution the potassium nitrate crystallizes while the sodium nitrate remains in solution. By this method of fractional crystallization, as the original substances were almost free of chlorin, a very pure nitrate of potassium is obtained directly which is to be preferred to the method of converting directly by means of potassium chlorid. The lye remaining finally after concentrating same repeatedly, consisting of sodium nitrate and still containing a little potassium nitrate can be used preferably for converting with potassium chlorid or the solution can be converted directly with potassium chlorid.

A modification of the method which is especially useful when the ratio of sodium to potassium is high, is this, that calcium nitrate is added in a quantity equivalent to the amount of potassium. For example, the following reaction then takes place:

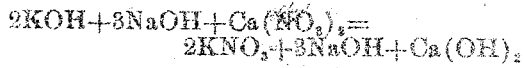

Therefore potassium nitrate and sodium hydroxid are obtained while calcium is precipitated; besides, the impurities mentioned above, as aluminium compounds and silicic acid, and carbonic acid, are separated at the same time so that the caustic soda is very pure. The solution separated from the residue, and concentrated correspondingly is cooled whereby most of the potassium nitrate crystallizes. By further concentrating the lye more potassium nitrate is separated which preferably is returned to the original lye. The potassium nitrate freed from lye by centrifugal force or otherwise is again purified by washing, eventually by adding a little nitric acid, this being done without difficulty because of the absence of other salts, especially of chlorin compounds.

The advantage of producing potassium nitrate besides sodium hydroxid is this that the hydroxyl-ions combined with sodium are retained. By using sodium nitrate instead of calcium nitrate in a quantity equivalent to the potassium the hydroxyl combined with the potassium can also be obtained, while only the nitrate changes its basis, according to the following formula:

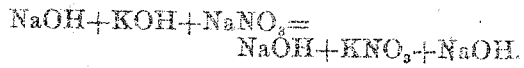

By this method it is also possible to separate aluminium compounds and also silicic acid on account of the presence of the nitrate whereby pure caustic soda lye is obtained. The separation is exactly the same as above. Therefore, from a lye not useful itself, two pure products are obtained, viz. potassium nitrate and sodium hydroxid. Furthermore it was discovered that it was not necessary for this method to treat the original lye with calcium nitrate, said lye being obtained by lixiviating systematically the slime of the calcium silicate. On the contrary, the aqueous suspension of the slime can be treated directly, without separating the alkali-metals compounds formed from the residue contained in the reaction product of the silicate mineral with lime, etc., with the required quantity of calcium nitrate and can be separated from the residue only after complete transformation of the alkali-metals compounds. Thereby the separation of the alkali-metals compounds from the silicates can be combined in one operation with the transformation of these products of separation into nitrates.

In this process all compounds in suspension except the alkali-metals compounds remain as insoluble slime which apparently consists essentially of double-silicates of calcium- and aluminium-oxid besides zeolite-like compounds, and of calcium hydroxid and carbonate, iron oxid, magnesia, etc. Since silicic acid and aluminium compounds are not present in colloidal, but in compound form the extremely voluminous alkaline slime can be separated quite easily from the aqueous solution and be washed. The solution obtained contains only the alkali-metals compounds in a very pure state. The solution is then treated in the manner described above. The direct transformation of the slime-like product by calcium nitrate has the further advantage that the separation of the alkali-metals compounds formed from the extremely large quantity of the residues is facilitated by the previous transformation into nitrates and that thereby the gain of alkali-metals compounds is increased.

The reason that the washing of alkali-metals compounds in the form of the separated alkali-metals compounds is difficult and is only partly successful, are probably the peculiar properties not fully explained of the zeolite-like compounds contained in the slime which can retain eventually alkali-metals compounds and the formation of slightly soluble alkali-calcium compounds, as observed for instance in the gaylussite. Apparently the alkali nitrates are retained less easily.

Where free nitric acid, i. e. manufactured, is obtainable the same can be used instead of calcium nitrate for this process. Also nitro-gases can be used with advantage. The use of nitro-gases is advantageous because the costs of evaporating can be saved as the evaporation of the water introduced by the calcium nitrate solution or diluted acid is eliminated thereby. The nitro-gases can be absorbed by any of the known methods, preferably by treating the fused silicate-calcium-mixture dry directly with nitro-gases in a similar way as in the known methods used for lime. By suspending the products of the reaction in water the alkali-metals compounds are dissolved as nitrates besides much lime.

In practice it will be often difficult to determine at once the equivalent proportion of acid and base. Especially by using nitrogases it is almost impossible to interrupt the process of absorption when the desired proportion of acid and alkali is obtained. A modification of the method is, therefore, that at first a part of the slime or the original lye is treated with an excess of calcium nitrate, nitric acid or nitro-gases and then slime or original lye is added until the desired proportion of acid and alkali-metals compounds is produced. Thereby all other bases at first dissolved, as for instance calcium- magnesium- iron-oxids, aluminium compounds, are again precipitated while only potassium nitrate and sodium nitrate, or potassium nitrate and sodium hydroxid stay in solution. Furthermore it was discovered that the insoluble residues of the method of extracting alkali-metals compounds from silicate minerals could be used for an excellent fertilizer. The process of working up the residues for fertilizers has the great advantage that firstly the previously entirely useless products and especially the lime contained therein are rendered useful, and secondly that the expensive nitrates do not need to be washed so carefully as would be necessary otherwise because this washing is a difficult operation on account of the quantity of the residue being extremely large in respect to the alkali-metals compounds. Therefore through omitting the careful washing, labor is saved and no nitric acid is lost. If instead of this nitrate-fertilizer containing all parts of the residue commercially pure calcium nitrate is to be prepared this can be done easily by adding lime until the solution reacts neutral or alkaline. Thereby all bases together with silicic acid are precipitated while only lime as neutral, or basic calcium nitrate is in solution. The residue which is washed by systematic lixiviation can be used for manufacturing clay products.

I claim:

1. The process of extracting alkali-metals compounds from silicates containing alkali-metals compounds, comprising treating the silicates to furnish a mixture of alkali-metals compounds and converting the alkali-metals compounds in the mixture into nitrates.

2. The process of extracting alkali-metals compounds from silicates containing alkali-metals compounds, comprising treating the silicates to furnish a mixture of alkali-metals compounds and converting the alkali-metals compounds in the mixture partially into nitrates.

3. The process of extracting alkali-metals compounds from silicates containing alkali-metals compounds, comprising treating the silicates to furnish a mixture of alkali-metals compounds and adding substances containing $NO_3$-ions to the mixture.

4. The process of extracting alkali-metals compounds from silicates containing alkali-metals compounds, comprising treating the silicates to furnish a mixture of alkali-metals compounds and adding a nitrating compound.

5. The process of extracting alkali-metals compounds from silicates containing alkali-metals compounds, comprising treating the silicates to furnish a mixture of alkali-metals compounds and adding substances containing $NO_3$-ions in an amount equivalent to the amount of the alkali-metals compounds in the mixture.

6. The process of extracting alkali-metals compounds from silicates containing alkali-metals compounds, comprising treating the silicates to furnish a mixture of alkali-metals compounds, adding a substance containing $NO_3$-ions to the mixture to convert the compounds into nitrates, and separating the potassium nitrate from the sodium compounds.

7. The process of extracting alkali-metals compounds from silicates containing alkali-metals compounds, comprising treating the silicates to furnish a mixture of alkali-metals compounds, converting the compounds into nitrates, and fractionally crystallizing the potassium nitrate from the mixture.

8. The process of extracting alkali-metals compounds from silicates containing alkali-metals compounds comprising treating the silicates to furnish a mixture of alkali-metals compounds, converting the compounds into nitrates, adding potassium chlorid and separating the potassium nitrate from the sodium compounds.

9. The process of extracting alkali-metals compounds from silicates containing alkali-metals compounds, comprising treating the silicates to furnish a mixture of alkali-metals compounds, converting the compounds partially into nitrates, and fractionally crystallizing the potassium nitrate from the mixture.

10. The process of extracting alkali-metals compounds from silicates containing alkali-metals compounds, comprising treating the silicates to furnish a mixture of alkali-metals compounds, and treating the alkali-metals compounds with a nitrating compound in an amount equivalent to the amount of potassium compound.

11. The process of extracting alkali-metals compounds from silicates containing alkali-metals compounds, comprising treating the silicates to furnish a mixture of alkali-metals compounds, treating the alkali-metals compounds with a nitrating compound in an amount equivalent to the amount of potassium compound, and separating the potassium nitrate from the mixture.

12. The process of extracting metals compounds from silicates containing alkali-metals compounds, comprising treating the silicates to furnish a mixture of alkali-metals compounds and a slime of calcium silicate, and adding substances containing $NO_3$-ions to said mixture.

In testimony whereof I affix my signature in presence of two witnesses.

ANTON MESSERSCHMITT.

Witnesses:
   PAUL WALTHER,
   H. QUADFLIEG.